UNITED STATES PATENT OFFICE 2,631,920

COMPOSITIONS FOR THE IMPROVEMENT OF FASTNESS PROPERTIES OF DYEINGS AND PRINTINGS OF WATER-SOLUBLE DYESTUFFS

Otto Albrecht, Neue Welt, near Basel, Switzerland, assignor to Ciba Limited, Basel, Switzerland, a Swiss firm No Drawing. Application November 14, 1949, Serial No. 127,280. In Switzerland November 24, 1948

11 Claims. (Cl. 8—74)

The present invention is based on the observation that fastness properties of dyeings and printings produced from such water-soluble, direct-dyeing dyestuffs, the water solubility of which is determined by the presence of acid solubilising groups, such as sulphonic acid or carboxyl groups, and which are capable of forming complex copper compounds or which already contain copper in complex combination, can be improved when the said dyeings or printings are after-treated with aqueous solutions of condensation products, obtainable with the addition of acids, of aldehydes with compounds which contain at least once the atom grouping

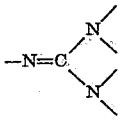

and when this treatment is combined with an after-treatment with water-soluble copper compounds.

This method of working possesses the advantage over the already known application of the condensation products of aldehydes with compounds with the above-indicated atom grouping, obtainable in the presence of alkaline additions, that the dyeings and printings after-treated according to the present invention exhibit a better stability to steaming, which is of particular importance for discharge printing. In addition the process according to the present invention can also offer the advantage that the after-treated dyeings and printings possess a better fastness to washing than comparable dyeings and printings which have been after-treated with corresponding condensation products, produced however in a medium of alkaline reaction.

The dyeings and printings, the fastness properties of which are intended to be improved according to the present process, can be made on any suitable material, for example on animal fibre material such as wool or silk, but especially on cellulose-containing fibre material, such as cotton, linen, artificial silk and staple fibre from regenerated cellulose and so on. For their manufacture direct dyeing dyestuffs are employed, which are soluble in water or the customary dyebaths which if desired may be weakly alkaline (for example alkaline with sodium carbonate), and in fact such as are capable of forming complex copper compounds or already contain copper in complex combination. With especial advantage dyeings and printings can be after-treated, from such water-soluble, direct-dyeing dyestuffs as contain in the molecule at least once the atom grouping

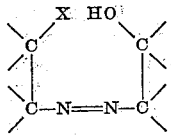

in which the pair of carbon atoms to which the X is attached belongs to a cyclic diazotisation component, the pair of carbon atoms to which the hydroxyl group is attached belongs to any suitable coupling component and X indicates a hydroxyl or a carboxyl group. Of the dyestuffs of this type those azo dyestuffs may be mentioned in particular in which at least once a benzene or naphthalene nucleus, substituted in ortho position with respect to the azo bridge by a hydroxyl or carboxyl group is linked by means of an azo bridge to a naphthalene or pyrazolone nucleus which is substituted in ortho position with respect to the azo bridge by a hydroxyl group. Dyestuffs of this type, in so far as they come into consideration for fibres of cellulose or regenerated cellulose, have hitherto been employed to a preponderating extent either in the form of their complex copper compounds for direct dyeing or as after-coppering dyestuffs, whereby in the latter case the after-treatment of the dyeings with agents providing copper is carried out either in a second bath, for example in weak acid solution, or directly in the alkaline dyebath itself. Compared with these known methods of working the new process is distinguished by the fact that in general dyeings with improved wet fastness properties are obtained.

If desired the direct-dyeing dyestuffs employed can contain in the molecule in addition to the atom grouping of the constitution above set forth, still further metal complex-forming atom groupings, as for example the salicylic acid grouping.

As aldehyde for the manufacture of the condensation products to be employed according to the present invention formaldehyde is primarily suitable. However other aldehydes, for example acetaldehyde, also come into consideration.

As compounds which contain at least once the atom grouping

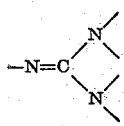

there can be employed for the manufacture of the condensation products to be applied according to the present invention, for example dicyandiamide, dicyandiamidine, guanidine, acetoguanidine, biguanide and also substitution products of these compounds such as alkyl-biguanides, aryl-biguanides, di- or other polybiguanides (obtainable in known manner from di- or other polyamines, for example from aliphatic diamines, from polyalkylene polyamines or from amines of the aromatic series with at least 2 amino groups). However, there are best suitable for the purposes of this invention, dicyandiamide, dicyandiamidine, guanidine, biguanide, also those derivatives of these nitrogen compounds in which at least one hydrogen atom is substituted by a hydrocarbon radical or a hydrocarbon radical containing at least one basic amino group. As amino substituted products there can be used those obtained by heating dicyandiamide with aliphatic polyamines, such as ethylene diamines or polyalkylene polyamines, e. g. diethylene triamine, triethylene tetramine or tetraethylene pentamine. In this operation the components may be heated e. g. to 110–150° C. in the presence or absence of a diluent, whereby ammonia may be split off. The resultant products are then condensed with aldehydes, such as formaldehydes.

As condensation products of these compounds with aldehydes, especially formaldehyde, there are suitable for the present process especially such as have been produced with more than 1 mol, for example 2–4 mols or more of aldehyde calculated on 1 mol of the compound which contains at least once the atom grouping

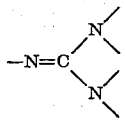

For the manufacture of the condensation products to be employed according to the present invention the components are reacted with the addition of acids, for example in the presence of inorganic acids, such as sulphuric acid or hydrochloric acid, advantageously in the hot, for example at 80–100° C. and if desired under pressure. Especially suitable products are obtained if the condensation is carried out in presence of water-soluble organic acids, especially low molecular fatty acids, such as formic acid or acetic acid. The quantity of the added acid can vary within wide limits: it can for example amount to $\tfrac{1}{10}$–1 mol of a monobasic acid to 1 mol of the compound with the specified atom grouping. More acid can, however, also be used in the condensation. The dicyandiamide-formaldehyde condensation products which are particularly suitable for the present improving process, can be obtained for example from 1 mol dicyandiamide and 2–4 mols formaldehyde in the presence of $\tfrac{1}{8}$–$\tfrac{1}{2}$ mol acetic acid, calculated on 1 mol of dicyandiamide. The process is suitably conducted in such a manner that the reaction mixture is heated for 1–8 hours to about 90–95° C. If necessary the hydrophile condensation products thus obtainable, which may constitute viscous solutions or jellies, are dried, which is suitably carried out under reduced pressure.

The after-treatment of the dyeings and printings according to the present invention with the aqueous solutions of the specified condensation products, which may for example be of 0.05–0.4% strength, can be carried out at room temperature or at elevated temperature, for example at 70–75° C.

The after-treatment baths can contain in addition to the specified condensation products soluble copper salts, for example copper sulphate, copper formate or copper acetate. The use of copper salts as an addition has in many cases the effect that any detrimental action by the specified condensation products upon the fastness to light of the dyeings or printings is no longer observed or only to a less extent. The addition of the copper compounds may also have a favourable influence in improving the fastness to washing.

Instead of the specified copper salts of inorganic or organic acids also water-soluble complex copper salts can be used. Among these may be mentioned copper complex salts containing for example ammonia or amines, such as trimethylamine, triethanolamine, ethylene diamine, pyridine or 8-aminoquinoline, for example complex formates, acetates, sulphates, chlorides or nitrates. Of these the following may be mentioned: Tetrammine-copper-II-acetate, tetrammine-copper-II-sulphate, tetrammine-copper-II-sulphamate, tetrammine-copper-II-nitrate, diethylenediamine-copper-II-acetate and also the complex compound from copper-II-acetate and triethanolamine. There are further concerned complex copper compounds of hydroxy carboxylic acids, such as glycollic acid, lactic acid or tartaric acid, for example copper-sodium-tartrate (known when in solution as Fehlings solution).

The application of complex copper salts instead of non-complex salts may have the advantage that the fastness to washing is improved to a greater extent or that any detriment to the fastness to light caused by the specified condensation products becomes less noticeable than in the case of the application of non-complex copper salts.

The above-mentioned dicyandiamide-formaldehyde condensation products are also especially suitable for use simultaneously with water-soluble copper compounds.

Instead of using the copper compounds simultaneously with the specified condensation products they can also be used in a separate bath after the treatment with the condensation products. In general however the single bath after-treatment will be preferred on account of the greater simplicity in operation.

When it is intended to employ complex copper salts simultaneously with the specified aldehyde condensation products, for the production of the after-treatment baths the condensation products and the complex copper compounds can be dissolved in water. Aqueous solutions of the complex copper compounds can also be produced in such a manner that complex-forming compounds, such as ammonia or amines, are added to the aqueous solution of the non-complex copper salts.

For the production of after-treatment baths containing copper compounds those products are best suitable which contain, on the one hand, the aforementioned condensation products from aldehydes, especially formaldehyde, with dicyandiamide, dicyandiamidine, guanidine, biguanide, also derivatives of these nitrogen compounds in which at least one hydrogen atom is substituted by a hydrocarbon radical or a hydrocarbon radical containing at least one basic amino group, and, on the other hand, water-soluble copper salts.

The following examples illustrate the invention, the parts being by weight:

Example 1

100 parts of cotton fabric dyed with 1.2% of the brown dyeing dyestuff of the formula

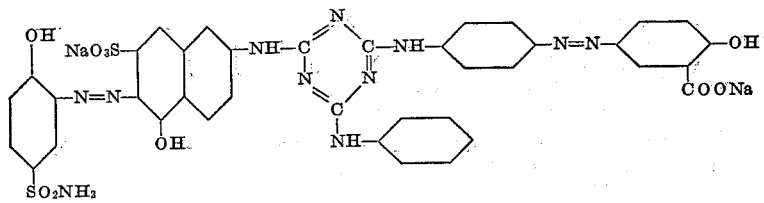

are after-treated for ½ hour at 20° C. in a bath prepared by dissolving 1.4 parts of the dicyandiamide-formaldehyde condensation product described below and 0.6 part of copper acetate in 3000 parts of water. The fabric is thereupon hydroextracted and dried. There is obtained in this manner an essential improvement of the fastness to washing of the dyeing, in particular to a washing with soap and soda at 70° C.

The above-mentioned condensation product can be obtained as follows: 200 parts of dicyandiamide are dissolved with heating in 434 parts of aqueous 36.9% formaldehyde solution, 24 parts of glacial acetic acid are introduced and the whole heated for about 6 hours to 90–95° C. The reaction solution thus obtained is thereupon dried at 50–55° C. under reduced pressure whereby a colourless pulverisable mass is obtained which is soluble in warm water.

A condensation product with similar properties is obtained if instead of 434 parts of the above formaldehyde solution only 380 parts are used for the reaction with 200 parts of dicyandiamide.

Example 2

The process is conducted according to the directions of Example 1 but using together with copper acetate the condensation product described below:

16.4 parts of a mixture of biguanide nitrate and guanidine nitrate, as is obtainable by heating dicyandiamide with ammonium nitrate in known manner, are dissolved in 18.1 parts of hot 36.5% formaldehyde solution. After addition of 1 part of glacial acetic acid the reaction solution is heated for 6 hours to 90–95° C. and thereupon evaporated under reduced pressure to dryness. There is obtained a colourless pulverisable mass which is soluble in hot water.

The dying after-treated with the above product in the presence of copper acetate possesses essentially improved wet fastness properties.

In lieu of the aforementioned mixture of biguanide nitrate and guanidine nitrate one can use the corresponding quantity of one of the components thereof, namely, guanidine nitrate or biguanide nitrate alone, or the corresponding quantity of a mixture of the free bases, to produce the condensation product.

Likewise, there may be used instead of 36.5 parts of the aforementioned formaldehyde solution only 30 parts for the reaction described above, to obtain a condensation product with similar properties. Moreover, in the above condensation, the glacial acetic acid can be replaced by a corresponding quantity of concentrated hydrochloric acid.

Example 3

The process is conducted according to the directions of Example 1 but using together with copper acetate the condensation product described below:

100 parts of dicyandiamide are dissolved in 291 parts of warm 36.9% formaldehyde solution and after addition of 12 parts of glacial acetic acid, heated for 6 hours to 90–95° C. After drying there is obtained a pulverisable, colourless mass which is soluble in warm water.

The dyeing after-treated with this condensation product in the presence of copper acetate possesses essentially improved fastness to water and washing than the untreated dyeing.

In this example the glacial acetic acid may be replaced by a corresponding quantity of concentrated hydrochloric acid.

Example 4

The process is conducted according to the directions of Example 1 but using together with copper acetate the condensation product described below.

100 parts of dicyandiamide are dissolved in 194 parts of warm 36.9% by weight formaldehyde solution, 24 parts of glacial acetic acid are introduced and the whole heated for 5 hours to 90–95° C. After drying there is obtained a colourless, pulverisable mass which is soluble in warm water.

By after-treatment with the above described condensation product with addition of copper acetate the fastness to washing of the dyeing, in particular to a washing at 70° C., is essentially improved.

Example 5

In this example there is used: (a) the dyestuff which dyes cotton yellowish-green and is obtained when the diazotised aminoazo dyestuff from 4-diazo-1-oxybenzene-2-carboxylic acid and 1-amino-2-ethoxynaphthalene is coupled with the ternary condensation product from 1 mol cyanuric chloride, 1 mol 1-amino-8-oxynaphthalene-3:6-disulphonic acid and 2 mols 4-amino-4'-oxy-1:1' - azobenzene - 3' - carboxylic acid; (b) the dyestuff which dyes cotton violet brown and which is obtained when tetrazotised 4:4'-diamino-3:3'-dimethoxydiphenyl is coupled on the one hand with salicylic acid and on the other hand with the monoazo dyestuff from 2-diazo-1-oxybenzene-4-sulphonic acid and resorcinol and when the product is after-coppered for 1 hour at 80° C.

100 parts of cotton yarn which have been dyed with 1.25% of the dyestuff set forth under (a) above or with 1.2% of the dyestuff set forth under (b) above, are after-treated for ½ hour at 20° C. in a bath which is prepared by dissolving 2.25 parts of the condensation product described in Example 1 from dicyandiamide and formaldehyde, 0.75 part of copper acetate and 6 parts of concentrated aqueous ammonia solution in 3000 parts of water. Thereupon the yarn is hydroextracted and dried. There is obtained in this manner an essential improvement of the fastness to washing of the dyeing, in particular to a washing with soap and soda at 40° C.

For the preparation of the after-treatment bath it is also possible to proceed in such a manner that 3 parts of a mixture containing 75% of the condensation product described in Example 1 and 25% of copper acetate is dissolved in 3000 parts of water and 6 parts of concentrated aqueous ammonia solution added.

Instead of the condensation product from dicyandiamide and formaldehyde condensation products from formaldehyde and biguanide in the presence of acid can be employed.

In the above described preparation of the after-treatment bath there can be used instead of copper -II-acetate also copper -II-formate, copper-II-sulphate, copper -II-chloride or copper-II-nitrate.

*Example 6*

The dyestuff is employed which dyes cotton yellow and is obtained when a mixture of 1 mol

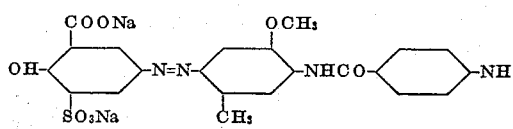

and 1 mol

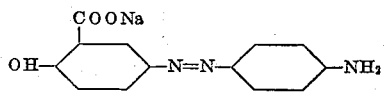

is phosgenated in the presence of sodium carbonate.

100 parts of cotton fabric which has been dyed with 0.433% of the above specified dyestuff are aftertreated for ½ hour at 20° C. in a bath which is prepared by dissolving 2.25 parts of the condensation product described in Example 1 from dicyandiamide and formaldehyde, 0.75 part of copper acetate and 6 parts of concentrated aqueous ammonia solution in 3000 parts of water. Thereupon the fabric is hydroextracted and dried. There is obtained in this manner an essential improvement of the fastness to washing of the dyeing, in particular to a washing with soap and soda at 70° C.

*Example 7*

In this example there is employed (a) the dyestuff dyeing cotton blue of the formula

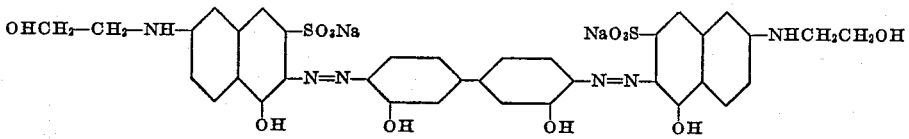

(b) the dyestuff dyeing cotton green of the formula

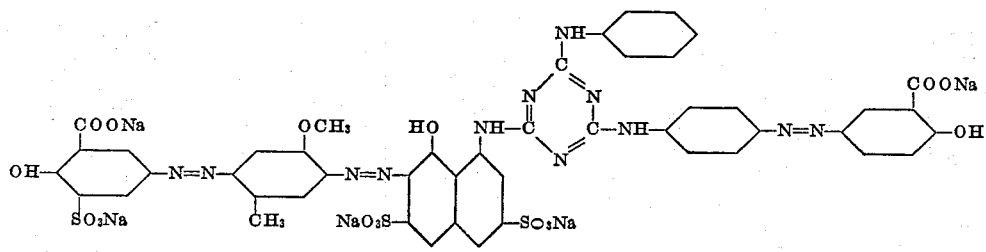

100 parts of cotton fabric which have been dyed with 0.5% of the dyestuff given above under (a) or with 1.25% of the dyestuff given above under (b), are after-treated in the same manner as set forth in Example 6. There is obtained in this manner an essential improvement of the fastness to washing of the dyeing, in particular to a washing with soap and soda at 70° C.

*Example 8*

There is employed in this example (a) the dyestuff dyeing cotton black-brown of the formula

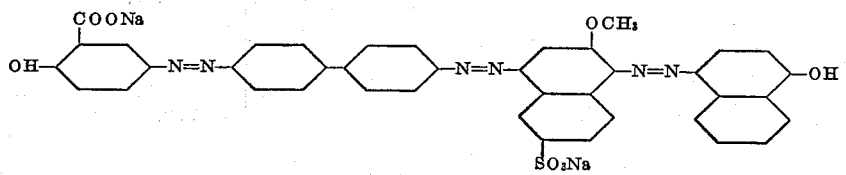

(b) the dyestuff dyeing cotton yellow of the formula

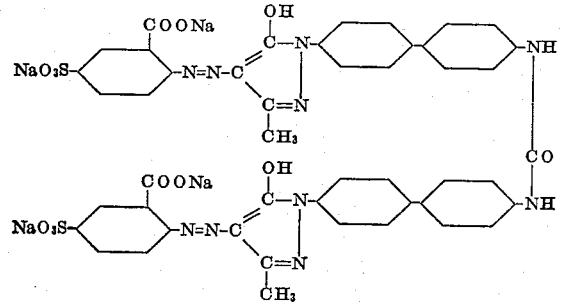

100 parts of cotton fabric which have been dyed with 0.75% of the dyestuff set forth above under (a) or with 1.12% of the dyestuff set forth above under (b), are after-treated during ½ hour at 70° C. in a bath which is prepared by dissolving 1.8 parts of the condensation product described in Example 1 from dicyandiamide and formaldehyde, 1.2 parts of copper acetate in 3000 parts of water. Thereupon the fabric is hydroextracted and dried. There is obtained in this manner an essential improvement of the fastness to washing of the dyeings, in particular to a washing with soap and soda at 70° C.

*Example 9*

The process is conducted according to Examples 6, 7 or 8 but there is used instead of the dicyandiamide-formaldehyde condensation product employed in these examples the product produced in the manner set forth below.

206 parts of dicyandiamide are dissolved in 600 parts of 36.8% formaldehyde solution with heating to 75° C., the whole is allowed to cool to 60° C., 30 parts of glacial acetic acid introduced and the whole heated in a closed vessel for about 6 hours to 93–95° C. In this operation the pressure in the gas space of the reaction vessel is not allowed to rise above 2 atmospheres superatmospheric, which can be effected by means of a release device. After the specified duration of reaction the reaction mixture is dried, for example at 50–55° C. under reduced pressure. By this means there is obtained a colourless easily pulverisable and water-soluble condensation product.

By the specified after-treatment there is obtained an essential improvement of the fastness to washing of the dyeings, in particular to a washing with soap and soda at 70° C.

*Example 10*

100 parts of cotton fabric which has been dyed with 1.25% of the dyestuff of the formula

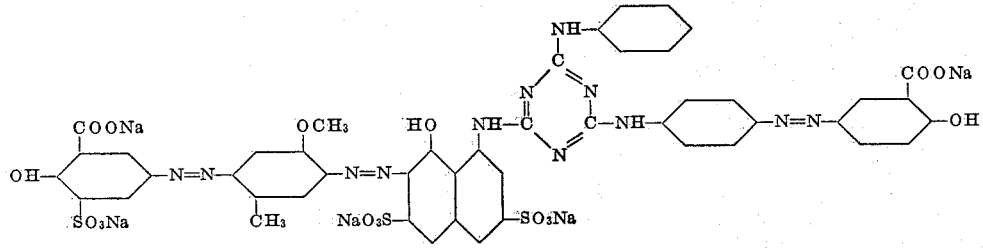

are treated with 3000 parts of an aqueous solution containing 225 parts of dimethylolurea, 30 parts of a concentrated commercial ammonia solution, 21 parts of ammonium acetate, 9 parts of copper acetate and 21 parts of the dicyandiamide-formaldehyde condensation product described in Example 1. After squeezing out the fabric is dried, heated for 5 minutes to 140° C. and subsequently washed at 40° C. for 10 minutes with a 0.1% sodium carbonate solution, bath ratio 1:30. Thereupon the fabric is rinsed and dried. There is obtained in this manner a material with a creaseproof finish and of which the dyeing possesses excellent wet fastness properties.

*Example 11*

The procedure is as described in Example 1, except that use is made, in addition to copper acetate, of the condensation product obtained as follows:

10.2 parts of dicyandiamidine are dissolved in 13.2 parts of 36.9% formaldehyde solution and the pH adjusted to 4.6. This solution is then heated to 90–95° C. for six hours and evaporated to dryness under reduced pressure. The residue is a colourless, pulverisable mass which is soluble in hot water.

An after-treatment with the above described condensation product with addition of copper acetate considerably enhances the fastness of the dyeing to washing, especially to a washing at 70° C.

*Example 12*

The procedure is as described in Example 6, except that use is made, in addition to copper acetate, of the condensation product obtained as follows:

80 parts of triethylene tetramine, 160 parts of finely powdered dicyandiamide and 320 parts of n-butanol are heated to the boiling point of the solvent for 20 hours. After cooling, undissolved matter is removed by filtration and the solvent distilled off the filtrate under reduced pressure. 17.5 parts of the residue thus obtained are dissolved in 30.6 parts of 36.8% formaldehyde solution, admixed with 4.4 parts of glacial acetic acid and heated for an hour and a half in the boiling water bath. After drying the new condensation product is a resin which is soluble in hot water.

*Example 13*

The procedure is as described in Examples 6, 7, or 8, except that instead of the condensation products there mentioned, use is made of the product obtained as indicated below.

10.6 parts of phenylbiguanide hydrochloride are dissolved in 18 parts of 18.4% formaldehyde solution at 75–80° C. 0.5 part of glacial acetic acid is added and the whole is heated for six hours in a boiling water bath. The reaction solution is evaporated to dryness under reduced pressure at 50–60° C. The resultant residue, a solid pulverisable mass, is soluble in hot water.

*Example 14*

The procedure is as indicated in Example 1, except that in addition to copper acetate use is made of the condensation product obtained as described below and dissolved in acid.

Benzidine is converted into the dihydrochloride of diphenylene dibiguanide by the method usually employed for the production of arylbiguanides, namely, by heating with 2 mols of dicyandiamide in hydrochloric acid solution.

4.4 parts of this dihydrochloride are dissolved at 75–80° C. in 3.6 parts of 36.8% formaldehyde solution and 4 parts of water, 0.2 part of glacial acetic acid are added, and the whole then heated for an hour and a half in a boiling water bath. During this time the reaction solution becomes considerably thicker. After drying under reduced pressure at a low temperature, the new condensation product is a solid pulverisable mass which slowly dissolves when heated with dilute formic acid.

Having thus described the invention, what is claimed is:

1. A composition of matter for improving the fastness properties of dyeings and prints of water-soluble substantive dyestuffs, the water-solubility of which is due to the presence of an acid solubilising group, and which form complex copper compounds when treated with water-soluble copper compounds and which dyeings have to be coppered to give dyeings of valuable properties, consisting essentially of (a) a condensation product of an aldehyde with a nitrogen compound selected from the group consisting of dicyandiamide, dicyandiamidine, guanidine, biguanide, derivatives of these nitrogen compounds wherein at least one hydrogen atom is substituted by a hydrocarbon residue, and derivatives of these nitrogen compounds wherein at least one hydrogen atom is substituted by a hydrocarbon residue containing at least one basic amino group, which condensation product has been produced by reacting 1 to 4 mols of an aldehyde in a concentrated aqueous solution with 1 mol of the nitrogen compound with the addition of 0.1 to 0.9 equivalent of an acid for each mol of nitrogen compound at a temperature exceeding 50° C., but lower than the temperature of decomposition of the condensation product for a time at least as long as is necessary for reaction to take place, but insufficient to produce condensation products which are insoluble in dilute formic acid, and (b) a water-soluble copper compound.

2. A composition of matter for improving the fastness properties of dyeings and prints of water-soluble substantive dyestuffs, the water-solubility of which is due to the presence of an acid solubilising group, and which form complex copper compounds when treated with water-soluble copper compounds and which dyeings have to be coppered to give dyeings of valuable properties, consisting essentially of (a) a condensation product of formaldehyde with dicyandiamide, which condensation product has been produced by reacting 1 to 4 mols of formaldehyde in a concentrated aqueous solution with 1 mol of dicyandiamide with the addition of 0.1 to 0.9 equivalent of an acid for each mol of dicyandiamide at a temperature exceeding 50° C., but lower than the temperature of decomposition of the condensation product for a time at least as long as is necessary for reaction to take place but insufficient to produce condensation products which are insoluble in hot water, and (b) a water-soluble copper compound.

3. A composition of matter for improving the fastness properties of dyeings and prints of water-soluble substantive dyestuffs, the water-solubility of which is due to the presence of an acid solubilising group, and which form complex copper compounds when treated with water-soluble copper compounds and which dyeings have to be coppered to give dyeings of valuable properties, consisting essentially of (a) a condensation product of 2 to 4 mols of formaldehyde with one mol of dicyandiamide, which condensation product has been produced by reacting 2 to 4 mols of formaldehyde in a concentrated aqueous solution with 1 mol of dicyandiamide with the addition of 0.1 to 0.9 equivalent of a lower fatty acid for each mol of dicyandiamide at a temperature between 50° C. and about 100° C. for about 6 hours and (b) a water-soluble copper compound.

4. A composition of matter for improving the fastness properties of dyeings and prints of water-soluble substantive dyestuffs, the water-solubility of which is due to the presence of an acid solubilising group, and which form complex copper compounds when treated with water-soluble copper compounds and which dyeings have to be coppered to give dyeings of valuable properties, consisting essentially of (a) a condensation product of 2 to 4 mols of formaldehyde with one mol of dicyandiamide, which condensation product has been produced by reacting 2 to 4 mols of formaldehyde in a concentrated aqueous solution with 1 mol of dicyandiamide with the addition of 0.1 to 0.5 mol of acetic acid for each mol of dicyandiamide at a temperature between 50° C. and about 100° C. for about 6 hours and (b) copper acetate.

5. A composition of matter for improving the fastness properties of dyeings and prints of water-soluble substantive dyestuffs, the water-solubility of which is due to the presence of an acid solubilising group, and which form complex copper compounds when treated with water-soluble copper compounds and which dyeings have to be coppered to give dyeings of valuable properties, consisting essentially of (a) a condensation product of 2.2 mols of formaldehyde with one mol of dicyandiamide, which condensation product has been produced by reacting 2.2 mols of formaldehyde in a concentrated aqueous solution with 1 mol of dicyandiamide with the addition of $\frac{1}{6}$ mol of acetic acid for each mol dicyandiamide at a temperature of 90–95° C. for about 6 hours and evaporating the water from the reaction mixture at 50–55° C. under reduced pressure, whereby a colorless pulverizable mass is obtained which is soluble in hot water, and (b) copper acetate.

6. A composition of matter for improving the fastness properties of dyeing and prints of water-soluble substantive dyestuffs, the water-solubility of which is due to the presence of an acid solubilising group, and which form complex copper compounds when treated with water-soluble copper compounds and which dyeings have to be coppered to give dyeings of valuable properties, consisting essentially of (a) a condensation product of formaldehyde with dicyandiamidine, which condensation product has been produced by reacting 1 to 4 mols of formaldehyde in a concentrated aqueous solution with 1 mol of dicyandiamidine with the addition of 0.1 to 0.9 equivalent of an acid for each mol of dicyandiamidine at a temperature exceeding 50° C., but lower than the temperature of decomposition of the condensation product for a time at least as long as is necessary for reaction to take place but insufficient to produce condensation products which are insoluble in hot water, and (b) a water-soluble copper compound.

7. A composition of matter for improving the fastness properties of dyeings and prints of water-soluble substantive dyestuffs, the water-solubility of which is due to the presence of an acid solubilising group, and which form complex copper compounds when treated with water-soluble copper compounds and which dyeings have to be coppered to give dyeings of valuable properties, consisting essentially of (a) a condensation product of 2 to 4 mols of formaldehyde with one mol of dicyandiamidine, which condensation product has been produced by reacting 2 to 4 mols of formaldehyde in a concentrated aqueous solution with 1 mol of dicyandiamidine with the addition of 0.1 to 0.9 equivalent of a lower fatty acid for each mol of dicyandiamidine at a temperature between 50° C. and about 100° C. for about 6 hours and (b) a water-soluble copper compound.

8. A composition of matter for improving the fastness properties of dyeings and prints of water-soluble substantive dyestuffs, the water-solubility of which is due to the presence of an acid solubilising group, and which form complex copper compounds when treated with water-soluble copper compounds and which dyeings have to be coppered to give dyeings of valuable properties, consisting essentially of (a) a condensation product of 2 to 4 mols of formaldehyde with one mol of dicyandiamidine, which condensation product has been produced by reacting 2 to 4 mols of formaldehyde in a concentrated aqueous solution with 1 mol of dicyandiamidine with the addition of 0.1 to 0.5 mol of acetic acid for each mol of dicyandiamidine at a temperature between 50° C. and about 100° C. for about 6 hours, and (b) copper acetate.

9. A composition of matter for improving the fastness properties of dyeings and prints of water-soluble substantive dyestuffs, the water-solubility of which is due to the presence of an acid solubilising group and which form complex copper compounds when treated with water-soluble copper compounds and which dyeings have to be coppered to give dyeings of valuable properties, consisting essentially of (a) a condensation product of formaldehyde with a mixture consisting of biguanide and guanidine, which condensation product has been produced by reacting 1 to 4 mols of formaldehyde in a concentrated aqueous solution with 1 mol of the above mixture with the addition of 0.1 to 0.9 equivalent of an acid for each mol of the above mixture at a temperature exceeding 50° C., but lower than the temperature of decomposition of the condensation product for a time at least as long as is necessary for reaction to take place but insufficient to produce condensation products which are insoluble in hot water, and (b) a water-soluble copper compound.

10. A composition of matter for improving the fastness properties of dyeings and prints of water-soluble substantive dyestuffs, the water-solubility of which is due to the presence of an acid solubilising group, and which form complex copper compounds when treated with water-soluble copper compounds and which dyeings have to be coppered to give dyeings of valuable properties, consisting essentially of (a) a condensation product of 2 to 4 mols of formaldehyde with one mol of a mixture consisting of biguanide and guanidine, which condensation product has been produced by reacting 2 to 4 mols of formaldehyde in a concentrated aqueous solution with 1 mol of the above mixture with the addition of 0.1 to 0.9 equivalent of a lower fatty acid for each mol of the above mixture at a temperature between 50° C. and about 100° C. for about 6 hours, and (b) a water-soluble copper compound.

11. A composition of matter for improving the fastness properties of dyeings and prints of water-soluble substantive dyestuffs, the water-solubility of which is due to the presence of an acid solubilising group, and which form complex copper compounds when treated with water-soluble copper compounds and which dyeings have to be coppered to give dyeings of valuable properties, consisting essentially of (a) a condensation product of 2 to 4 mols of formaldehyde with one mol of a mixture consisting of biguanide and guanidine, which condensation product has been produced by reacting 2 to 4 mols of formaldehyde in a concentrated aqueous solution with 1 mol of the above mixture with the addition of 0.1 to 0.5 mol of acetic acid for each mol of the above mixture at a temperature between 50° C. and about 100° C. for about 6 hours, and (b) copper acetate.

OTTO ALBRECHT.

REFERENCES CITED

The following references are of record in the file of this patent:

UNITED STATES PATENTS

| Number | Name | Date |
|---|---|---|
| 2,033,836 | Lantz | Mar. 10, 1936 |
| 2,253,457 | Whittacker | Aug. 19, 1941 |
| 2,364,726 | Landolt | Dec. 12, 1944 |
| 2,405,863 | Treboux | Aug. 13, 1946 |
| 2,435,591 | Landolt | Feb. 10, 1948 |
| 2,440,988 | Treboux | May 4, 1948 |
| 2,526,106 | Albrecht | Oct. 17, 1950 |

FOREIGN PATENTS

| Number | Country | Date |
|---|---|---|
| 314,358 | Great Britain | June 24, 1939 |
| 323,665 | Germany | July 31, 1920 |
| 325,647 | Germany | Sept. 21, 1920 |
| 599,380 | Great Britain | Mar. 22, 1948 |
| 572,778 | Great Britain | Oct. 23, 1945 |
| 599,830 | Great Britain | Mar. 22, 1948 |

OTHER REFERENCES

Chemical Abstracts for 1944, volume 38, column 3133.
Chemical Abstracts, volume 39, column 1060.
Chemical Abstracts, volume 37, column 1273.